US007446901B2

(12) United States Patent
Zeng et al.

(10) Patent No.: US 7,446,901 B2
(45) Date of Patent: Nov. 4, 2008

(54) CONFORMING OUTPUT INTENSITIES OF PENS

(75) Inventors: Huanzhao Zeng, Vancouver, WA (US); Kevin R. Hudson, Camas, WA (US)

(73) Assignee: Hewlett-Packard Development Company, Houston, TX (US)

( * ) Notice: Subject to any disclaimer, the term of this patent is extended or adjusted under 35 U.S.C. 154(b) by 941 days.

(21) Appl. No.: 10/624,410

(22) Filed: Jul. 21, 2003

(65) Prior Publication Data

US 2005/0018221 A1    Jan. 27, 2005

(51) Int. Cl.
G06F 15/00    (2006.01)
(52) U.S. Cl. ............... 358/1.9; 358/3.01; 358/504; 358/518; 358/520; 358/521; 358/523; 358/406; 347/9; 347/10; 347/11; 347/12; 347/13; 347/14; 347/15

(58) Field of Classification Search ............. 358/1.9, 358/501–504, 518, 523; 347/6, 9
See application file for complete search history.

(56) References Cited

U.S. PATENT DOCUMENTS

| 6,908,176 | B2 * | 6/2005 | Koitabashi et al. ............ 347/43 |
| 7,133,159 | B2 * | 11/2006 | Yang et al. .................... 358/1.9 |
| 2002/0159083 | A1 * | 10/2002 | Arai et al. .................... 358/1.9 |

* cited by examiner

*Primary Examiner*—Twyler Haskins
*Assistant Examiner*—Mark R. Milia

(57) ABSTRACT

A linearization data structure is generated for a pen, in view of another pen, for conforming output intensities of the pen to output intensities of the other pen.

25 Claims, 5 Drawing Sheets

---

Generate a Linearization Data Structure for a First Pen in view of a Standard
102

Generate a Linearization Data Structure for a Second Pen in view of the First Pen
104

CONFORMING OUTPUT INTENSITIES OF PENS

BACKGROUND

Imaging systems have become exceedingly popular peripherals for computers and other types of computerized devices. They enable users to print images onto media, thus such imaging systems may also be referred to as printers. The most common media is paper.

There are many different types of imaging systems, including most popularly inkjet printers and laser printers. Inkjet printers generally operate by ejecting fine droplets of ink onto the media, whereas laser printers generally operate by fusing toner onto the media. Either type of imaging systems may be a black and white only printer or a color printer.

Due to manufacturing and operating environment variances, imaging systems typically have to be calibrated for optimal performance. Often times, a one-dimensional linearization look-up table (LUT) is generated during calibration for each color channel, for use during operation, to linearize the output intensities of the corresponding pen. For example, for a color imaging system employing a cyan-magenta-yellow-black (CMYK) color space, a linearization LUT would be generated during calibration for each of the cyan, magenta, yellow, and black color channels, for use during operation, to linearize the output intensities of each of the cyan, magenta, yellow, and black color pens.

Typically, each linearization LUT is generated based on a range of target outputs, and in view of a standard, i.e. by determining the amount of corresponding adjustments required for the corresponding pen, such that the pen's output intensities are linear over the range, as called for by the standard.

Regardless of the techniques, calibrations are inherently imperfect, as they are affected by the environmental conditions under which the calibrations are performed, and subject to measurement errors. Thus, even though two pens of the same color may be calibrated using the same target outputs, and in view of the same standard, the output intensities of the calibrated pens may nevertheless be slightly different, especially if the calibrations are performed at different times, under different environmental conditions.

More importantly, when two of these pens of the same color channel are involved in contributing to the imaging/printing of a media end product, the slight difference may be sufficient to be discernable by consumers of the media end product imaged/printed, resulting in the consumers forming an opinion of "poor" imaging/printing quality of the imaging system(s).

Two "slight different" pens may be involved in contributing to the imaging/printing of a media end product under a variety of scenarios. For example, two imaging systems, each having one of the two pens of a color channel, may be involved in the imaging/printing of the media end product. As another example, two pens of a color channel, as members of two sets of multi-color pens of an imaging system having two imaging engines, may be involved in imaging/printing the media end product. As yet another example, one pen of a color channel of a bidirectional imaging system, used in two imaging directions, with the pen having different linearization LUTs for the different imaging directions, may be involved in the imaging/printing of the media end product.

BRIEF DESCRIPTION OF THE DRAWINGS

Embodiments of the present invention will be described referencing the accompanying drawings in which like references denote similar elements, and in which.

DETAILED DESCRIPTION OF EMBODIMENTS OF THE INVENTION

Embodiments of the present invention include, but are not limited to, methods to generate linearization data structures for pens of imaging system(s); storage medium, computing devices and/or imaging systems endowed with implementations of all or portions of the methods; and imaging engines and/or systems endowed with pens and associated linearization data structures accordingly generated.

In the following description, various aspects of embodiments of the present invention will be described. However, it will be apparent to those skilled in the art that embodiments of the present invention may be practiced with only some or all aspects described. For purposes of explanation, specific numbers, materials and configurations are set forth in order to provide a thorough understanding of these embodiments of the present invention. However, it will be apparent to one skilled in the art that various embodiments of the present invention may be practiced without the specific details. In other instances, well-known features are omitted or simplified in order not to obscure the disclosed embodiments of the present invention.

Various operations will be described as multiple discrete operations in turn, in a manner that is helpful in understanding these embodiments of the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
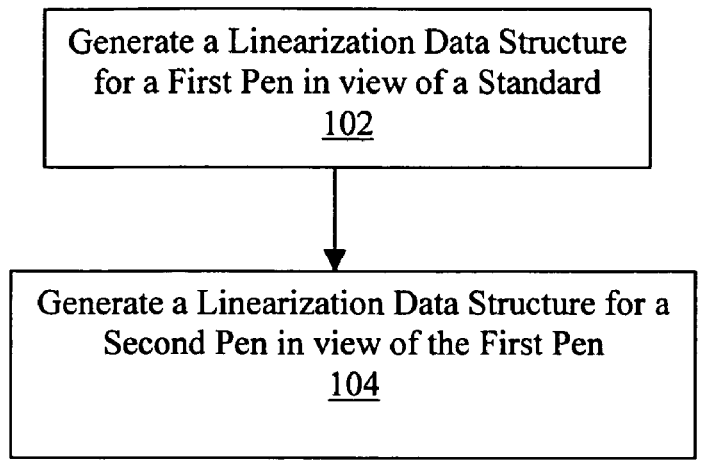
FIG. 1 illustrates a method in accordance with one embodiment of the present invention.

Referring now to FIG. 1 wherein an overview of a method, in accordance with one embodiment of the present invention, to create linearization data structures for pens of imaging systems is illustrated. As shown, for the embodiment, duration calibration, a linearization data structure having colorant output value to output intensity pairs, suitable for use during operation, to linearize output intensities of a first of two pens of a color channel, is first generated in view of a standard, block 102.

Hereinafter, colorant output value to output intensity pairs, may also be simply referred to as output value to output intensity pairs. For the purpose of this application, the two phrases may be considered synonymous, unless it is clearly indicated to the contrary.

Figure 3:
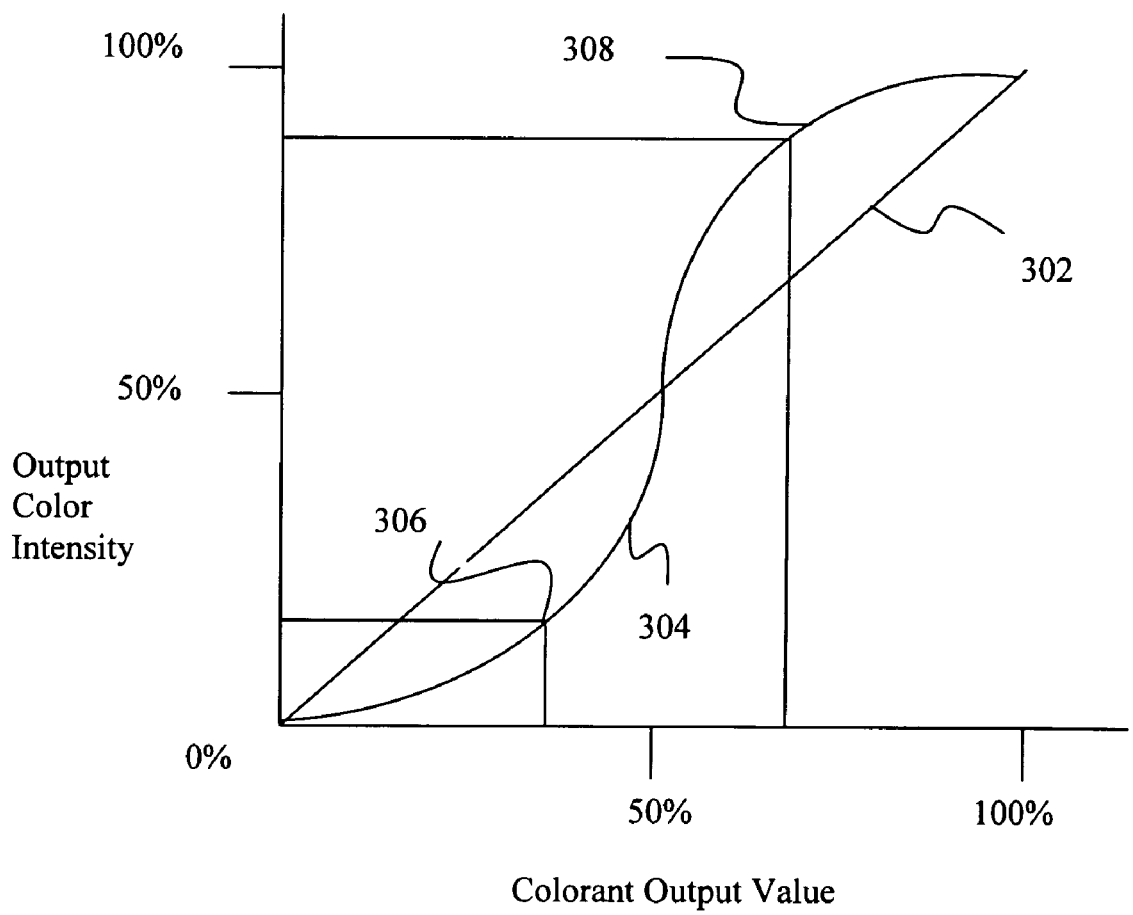
FIG. 3 illustrates an example graphical depiction of output intensities linearization.

A graphical depiction of a linearization data structure is illustrated in FIG. 3. As illustrated, non-linear graph 304 depicts the colorant output values to drive a pen of a color channel that yields the output color intensity. A pen upon which linearization has not been performed typically produces a non-linear curve, such as non-linear graph 304, instead of linear curve 302. To yield the linear output intensities depicted by linear graph 302, the colorant output values are modified. This may be accomplished using a linearization look up table. Through use of the linearization look up table the modified color output values are substituted for the color output values used to form non-linear graph 304 so that linear graph 302 results. Specifically, for the example depiction, overdriven output values are used to drive the lower 50% of the linear intensities, and under driven output values are nevertheless sufficient to drive the upper 50% of the linear intensities.

For example, an overdriven output value 306 closer to 50% is used to yield an output intensity of about 25%, and an under driven value 308 closer to 50% is sufficient to yield an output intensity near the 100%.

The linearization data structure may be generated in any one of a number of manners, including but not limited to techniques involving the use of target outputs.

The generated linearization data structure having multiple output value to output intensity pairs may be stored on computing devices and/or imaging systems in any one of a number of data organizations, including but not limited to the data organization of a look-up table form.

Referring back to FIG. 1, in various embodiments, this first of the two pens of a color channel having its linearization data structure generated in view of a standard, is the weaker pen of the two pens.

Accordingly, in various embodiments, the method may also include an operation (not shown) to determine which of the two pens of the color channel is the weaker pen.

Figure 4:
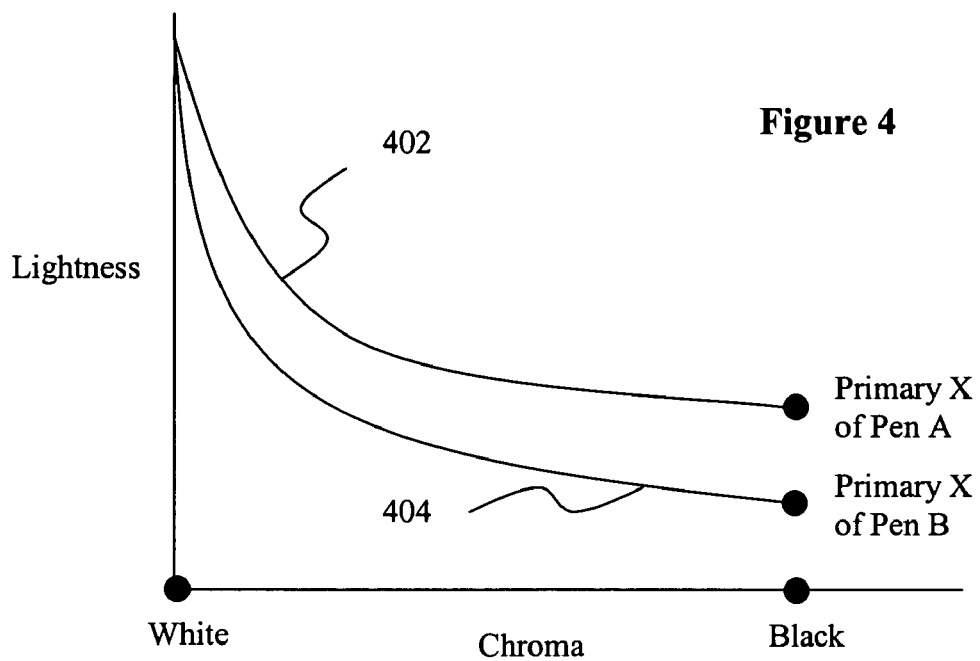
FIG. 4 illustrates two example color ramps suitable for use to determine the weaker one of two pens, in accordance with one embodiment.

In various embodiments, the determination of which of the two pens of the color channel is the weaker pen may be performed by comparing their respective output ramps, an example of which is shown in FIG. 4. For the example output ramps 402 and 404, they show the colorant output levels at which the respective pens achieve their respective minimum lightness.

In various embodiments, the pen having an associated output ramp where the pen with higher minimum lightness at 100% colorant output value is considered to be the weaker pen between the two pens (pen A in the example). While the comparison in FIG. 4 is in lightness unit, in other embodiments, the comparison may be performed in a different unit, such as density or chroma. If the density value is used, the weaker pen is determined as the one with lower density value at 100% colorant output value. If the chroma unit is used, the weaker pen is determined as the one with lower chroma at the 100% colorant output value.

Referring back to FIG. 1, in alternate embodiments, the first of the two pens of a color channel having its linearization data structure generated in view of a standard, may be arbitrarily selected among the two pens. Typically, for these embodiments, a common saturation control level, such as a common maximum saturation level, is set at a level that is equal to or lower than the lower of the maximum saturation levels of the two pens.

Still referring to FIG. 1, next, a linearization data structure having device output value to output intensity pairs, suitable for use during operation, to linearize output intensities of a second of two pens of a color channel, is then generated in view of the first pen, block 104.

Resultantly, output intensities of the second pen are not only linearized, but are conformed to the first pen at the same time. In other words, the output intensities of the two pens are not only linearized, they are linearized in a coordinated manner, to enable the output intensities of the two pens of a color channel to substantially proximate one another, therefore reducing the likelihood of perceivable differences between their outputs, leading to the perception of "poor" quality.

Various embodiments to generate the linearization data structure of the second pen, in view of the first pen, will be described in more detail below.

Figure 2A:
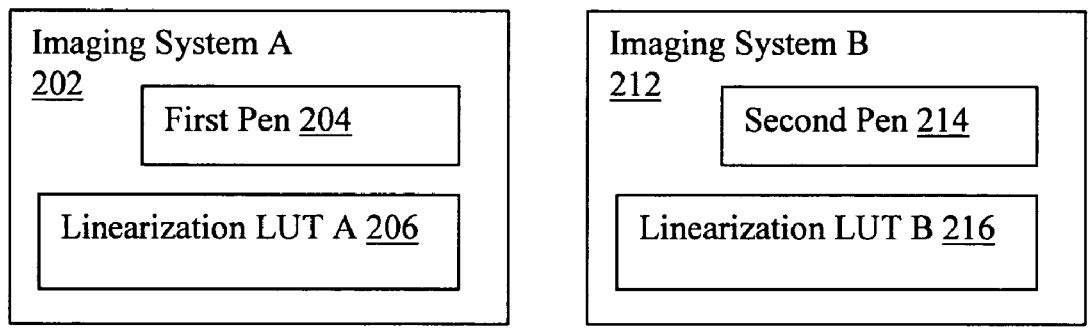
FIGS. 2a-2c illustrate various imaging systems, suitable for practicing embodiments of the present invention.
Figure 2B:
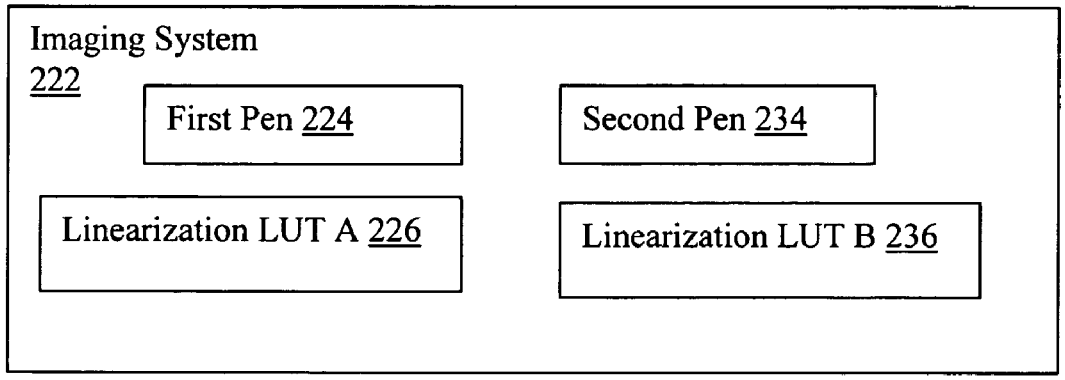
Figure 2C:
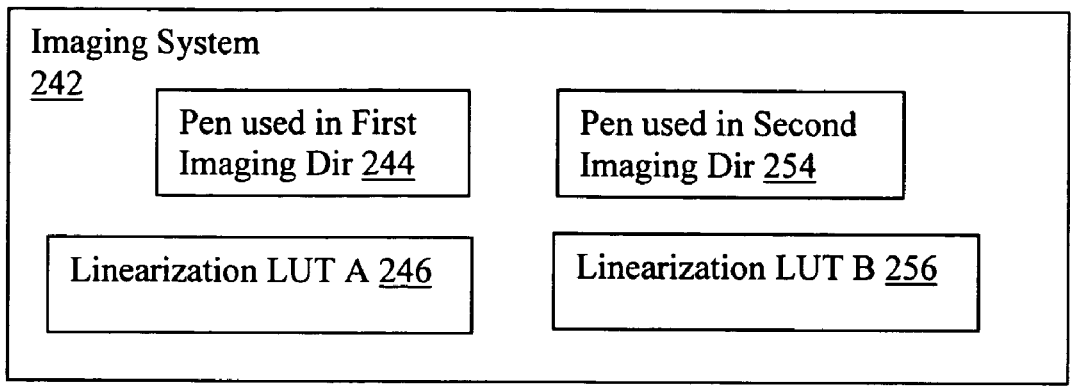

FIGS. 2*a*-2*c* illustrate various embodiments of imaging systems, suitable for practicing embodiments of the present invention. For the embodiment of FIG. 2*a*, imaging systems A 202 and B 212 comprise pen 204 and pen 214 for a color channel respectively. Pens 204 and 214 have associated linearization data structures 206 and 216 respectively. For the embodiment, linearization data structures 206 and 216 may be in the form of look-up tables (LUT). Further, linearization data structures 206 and 216 may be generated in accordance with a method similar to the method of FIG. 1 as earlier described.

For the embodiment of FIG. 2*b*, imaging system 222 comprises pen 224 and pen 234 for a color channel respectively. Pens 224 and 234 have associated linearization data structures 226 and 236 respectively. For the embodiment, linearization data structures 226 and 236 may be in the form of look-up tables (LUT). Further, linearization data structures 226 and 236 may be generated in accordance with a method similar to the method of FIG. 1 as earlier described.

Likewise, for the embodiment of FIG. 2*c*, imaging system 242 comprises a pen used in a first imaging direction 244 and the pen used in a second imaging direction 254 for a color channel respectively. Pen used in imaging directions 244 and 254 have associated linearization data structures 246 and 256 respectively. For the embodiment, linearization data structures 246 and 256 may be in the form of look-up tables (LUT). Further, linearization data structures 246 and 256 may be generated in accordance with a method similar to the method of FIG. 1 as earlier described.

Resultantly, the quality of media end products imaged/printed under each of these embodiments may be improved, because output intensities of the corresponding pens of a color channel are not only linearized, but substantially conform to each other.

It should be noted that in view of the foregoing, the term "pen" as used in the present application, including the claims, includes but are not limited to "physical" pens, as well as different "directional usages" of a pen.

Further, while for ease of understanding, only two pens of one color channel are shown in each of the illustrated embodiments. The method of FIG. 1 is not so limited. The method may be practiced on computing devices and color imaging systems employing two sets of multiple color pens as well as on black and white imaging systems employing two pens.

Further, for embodiments where two sets of multiple color pens are employed, e.g. {C1, M1, Y1, K1} and {C2, M2, Y2, K2}, C1, M2, Y1 and K2 may be the weaker pens of the respective color channels or they may be arbitrarily selected, and accordingly, their linearization data structures generated in view of a standard, and the linearization data structures of C2, M1, Y2 and K1 generated in view of C1, M2, Y1 and K2 respectively.

In other words, while the characteristics of some embodiments may be more suitable to generate the linearization data structures of {C1, M1, Y1, K1} in view of a standard, and the linearization data structures of {C2, M2, Y2, K2} generated in view of {C1, M1, Y1, K1} the method of FIG. 1 does not impose the limitation that all pens of a set be calibrated in view of a standard or against another set, as a set. Instead, each pen of each color channel is calibrated in view of a standard or a corresponding pen of the same color channel, independent of other pens' of the pen set to which the pen is a member.

Figure 5:
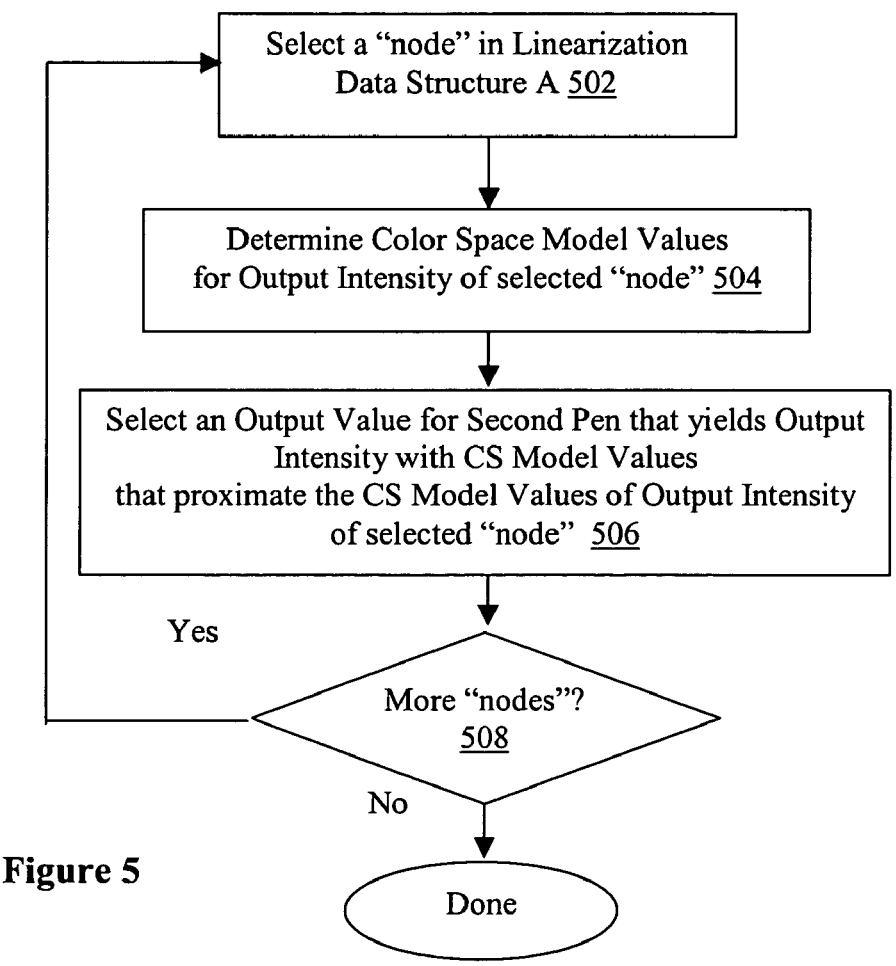
FIG. 5 illustrates a method of generating a linearization data structure for a pen, in view of another pen, to linearize and conform the output intensities to the other pen at the same time, in accordance with one embodiment.

FIG. 5 illustrates a method to generate a linearization data structure for a pen in view of another pen, in accordance with one embodiment. As illustrated, for the embodiment, the method first selects a "node", i.e. an output value to output intensity pair of the linearization data structure of the pen generated in view of a standard, block 502.

Next, the method determines color space model values for the output intensity of the selected "node", block 504. In various embodiments, the color space model may be the CIE L*, a*, b* color space model, and the color space model values are the L*, a* and b* values. In alternate embodiments, other color space models may be employed instead.

Next, the method selects an output value of the second pen that yields an output intensity with color space model values that proximate the color space model values of the output intensity of the selected "node", block 506. One embodiment of the selection operation will be further described.

On selection of the output value, the method determines if more "nodes" remain to be analyzed to assist in the selection of output values of the second pen for the "nodes", block 508. If so, the operation continues back at block 502, else the process is completed and terminates.

Figure 6:
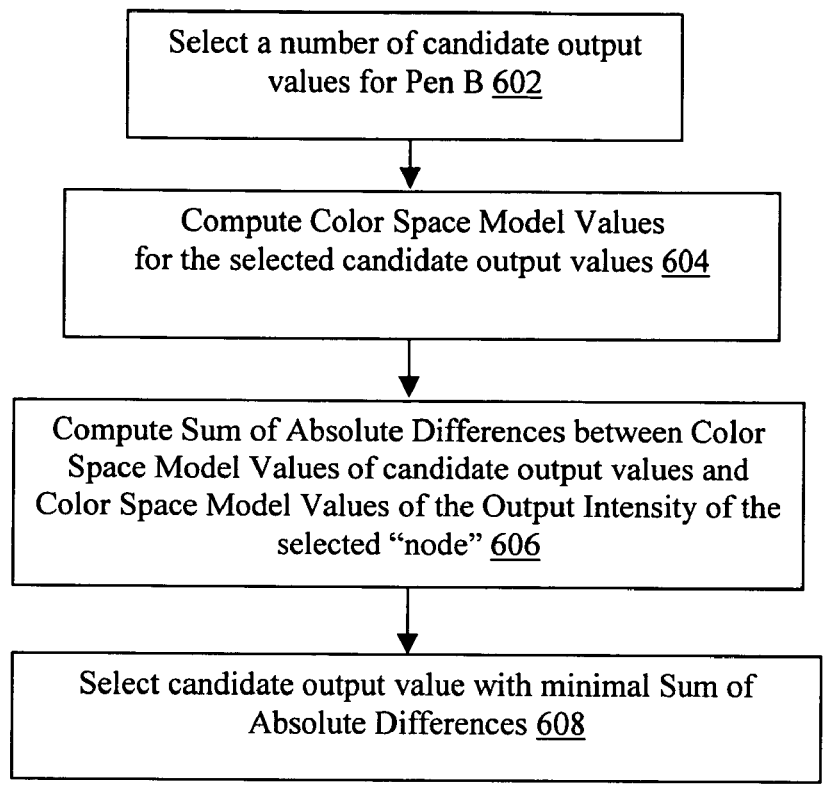
FIG. 6 illustrates a method of determining an output value for a pen to drive the pen to output intensities that proximate another pen, in accordance with one embodiment.

FIG. 6 illustrates a method to determine an output value of the second pen that will yield an output intensity that proximate a corresponding output intensity of the first pen, in accordance with one embodiment. As illustrated, first, a number of candidate output values are selected, block 602.

The candidate output values to be considered may be formed in one of a number of predetermined manners, including but not limited to, output values whose color model values are within a "neighborhood" of the model color values of the current selected "node" of the first pen. The size and shape of the "neighborhood" is implementation dependent, and may vary from embodiment to embodiment, depending possibly on, but not limited to, the substantiality of conformance between the two pens desired.

Next, at block 604, the method computes the color space model values for the selected candidate output values. Then at block 606, the method computes the sum of absolute differences between the color space model values of the selected candidate output values and the color space model values of the output intensity of the selected "node".

In various embodiments, the color space is the CIE L*a*b* color space model, and the computation of each sum of absolute differences is performed in accordance with the following equation:

$$\Delta E^* = (\Delta L^{*2} + \Delta a^{*2} + \Delta b^{*2})^{0.5}$$

where $\Delta E$ is sum of absolute difference of the color space model values, $\Delta L^{*2}$ is the square of the sum of differences between the lightness values of the two sets of color space model values, $\Delta a^{*2}$ and $\Delta b^{*2}$ are squares of the sum of differences between the chrominance values of the two sets of color space model values.

Then, for the embodiment, at block 608, the method determines the output value of the second pen that will yield an output intensity that proximate a corresponding output intensity of the first pen, by selecting the candidate output value with the color space model values that best proximate the color space model values of the selected "node" of the first pen, as indicated by the earlier described sum of absolute differences between the corresponding color space model values. More specifically, for the embodiment, the method selects the candidate output value with the smallest sum of absolute differences in color space model values.

Figure 7:
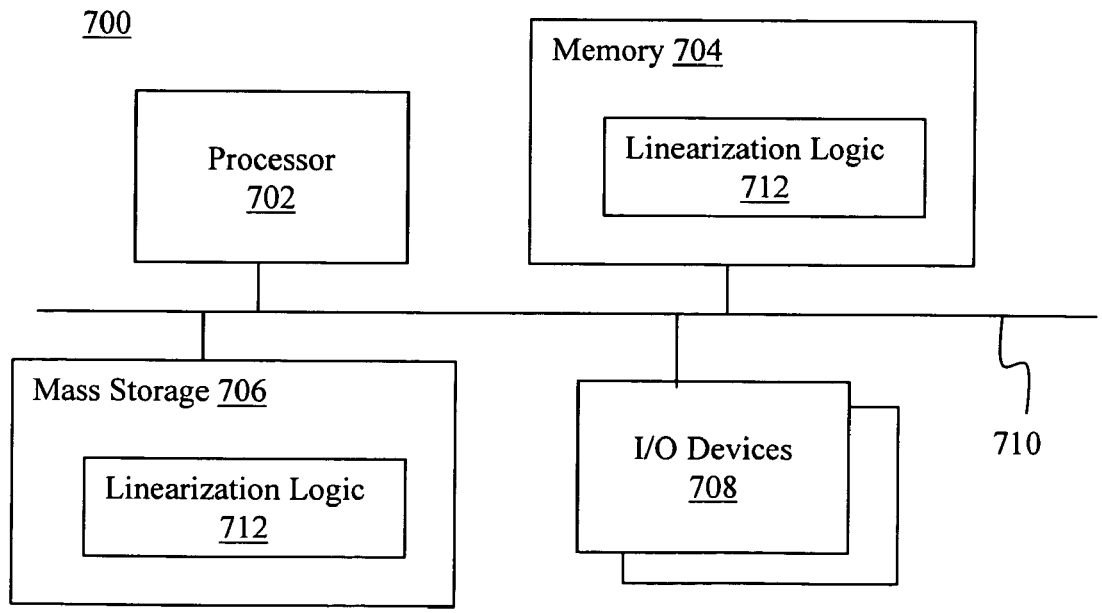
FIG. 7 illustrates a computing device incorporated with at least some of the linearization teachings in accordance with one embodiment of the present invention.

FIG. 7 illustrates a computing device, suitable for use to practice some or all aspects of the methods of FIGS. 1, 5 and/or 6, in accordance with one embodiment. As illustrated, for the embodiment, computing device 700 includes processor 702, memory 704, mass storage 706 and I/O devices 708 coupled to each other via bus 710. I/O devices 708 may include keyboards, cursor control devices, displays, communication interfaces, and so forth.

Memory 704 and mass storage 706 may be employed to store instructions and/or data, more specifically, a temporary and a permanent copy of linearization logic 712 implementing the methods of FIGS. 1, 5 and 6, respectively.

In other words, for the embodiment, computing device 700 may be employed, e.g. by a manufacturer of an imaging system, or a user of an image system, to calibrate and generate a linearization data structure, such as a table, for use during operation, to linearize the output intensities of a pen of a color channel of an imaging system, and conform the output intensities of the pen to another pen of the color channel of the same or another imaging system.

In particular, computing device 700 may be employed to generate the linearization data structure for the pen, by determining output values for the pen, based at least in part on proximity analysis of various color space model values of candidate output values and color space model values of various output intensities of the other pen.

Computing device 700 may be so employed for a number of pens of a number of color channels of a number of imaging systems.

In alternate embodiments, as alluded to earlier, linearization logic 712 may implement merely only some aspects of the methods of FIGS. 1, 5 and 6.

Otherwise, processors 702, memory 704, mass storage 706, I/O devices 708, and bus 710 represent a broad range of such elements.

In various embodiments, computing devices may be a server, a desktop computer, a computing tablet, a laptop computer, a palm sized personal assistant, a pocket PC, or other computing devices of the like.

Figure 8:
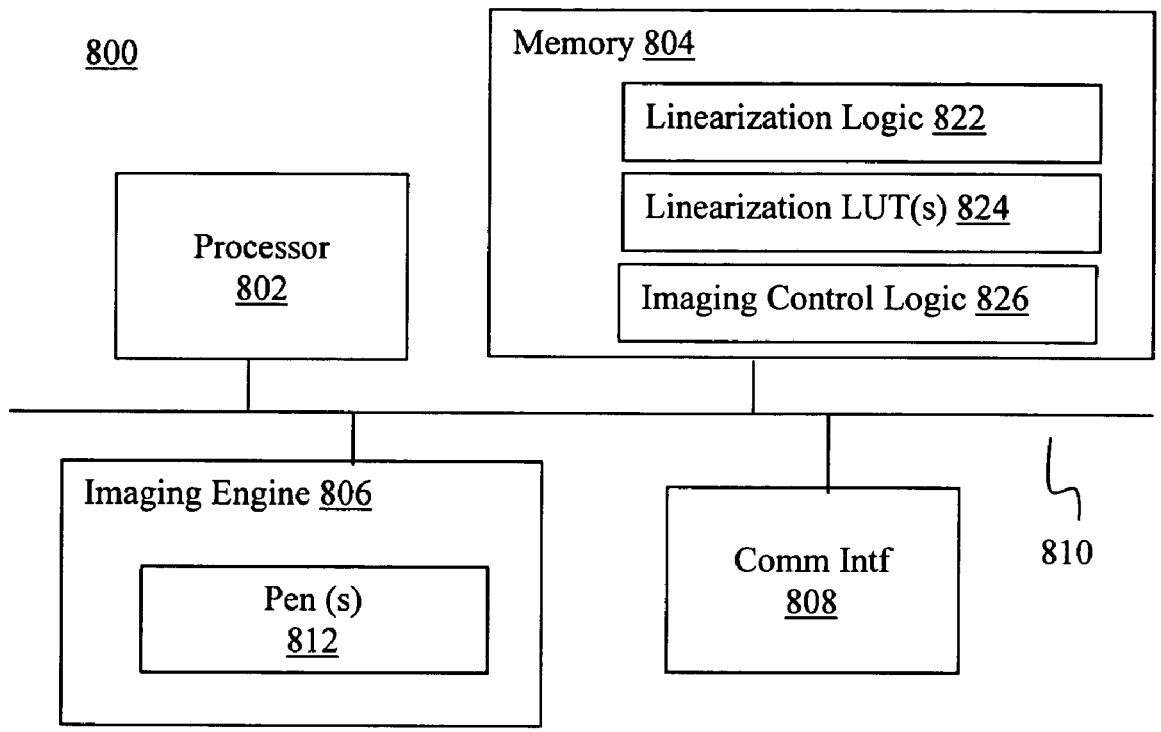
FIG. 8 illustrates an imaging system incorporated with at least some of the linearization teachings in accordance with one embodiment of the present invention.

FIG. 8 illustrates an imaging device, suitable for use to practice some or all of the methods of FIGS. 1, 5 and/or 6, in accordance with one embodiment. As illustrated, for the embodiment, imaging system 800 includes processor/controller 802, memory 804, imaging engine 806 and communication interface 808 coupled to each other via bus 810. Imaging engine 806 comprises pen(s) 812 having corresponding linearization data structure(s) to linearize, during operation, the output intensities of pen(s) 812, and to conform the output intensities to pen(s) of corresponding color channel(s).

Memory 804 is employed to store instructions and/or data, more specifically, imaging control logic 826, linearization LUT(s) 824 and linearization logic 822. Imaging control logic 826 is employed to control pens 812 to print images onto media. Linearization LUT(s) 824 are generated and employed as earlier described. Linearization logic 822 implements the methods of FIGS. 1, 5 and 6.

In other words, imaging device 800, in addition to being used for imaging on media, may be employed, e.g. by its manufacturer or a user, to calibrate and generate the linearization data structure(s), such as a table(s), for use during operation, to linearize the output intensities of pen(s) 812, and to conform the output intensities to other pen(s) of corresponding color channel(s).

In particular, imaging system 800 may be employed to generate the linearization data structure(s) for the pen(s), by determining output values for the pen(s), based at least in part on proximity analysis of various color space model values of candidate output values of the pen(s) and color space model values of various output intensities of the other pen(s).

In alternate embodiments, as alluded to earlier, linearization logic 812 may implement merely only some aspects of the methods of FIGS. 1, 5 and 6.

Imaging control logic 826 represents a broad range of such elements, including but not limited to imaging control logic found in many imaging systems available from Hewlett Packard Corp. of Palo Alto, Calif. In particular, imaging control logic 826 may be employed to image pixels of images onto media employing one or more colorants, with different desired intensities. Imaging control logic 826 accesses the linearization data structures of the pens of the desired colorants, determine the appropriate output values for the desired intensities, and drive the pens accordingly.

Otherwise, processors 802, memory 804, imaging engine 806, comm. interfaces 808, and bus 810 represent a broad range of such elements.

In various embodiments, imaging device 800 may be an inkjet printer or an electrophotographic printer.

Figure 9:
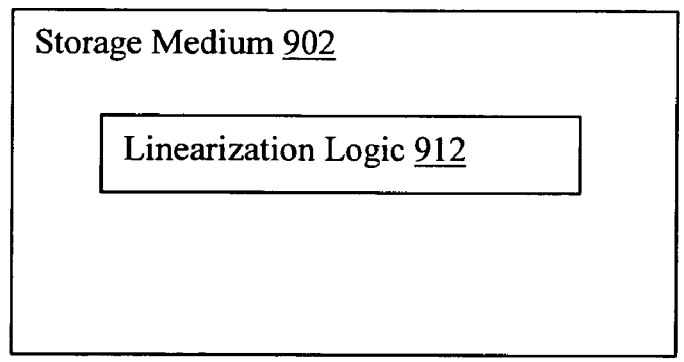
FIG. 9 illustrates a storage medium having the linearization logic of one embodiment of the present invention, suitable for use to program a computing device or an imaging system.

FIG. 9 illustrates an article suitable for use to store executable instructions implementing all or portions of the methods of FIGS. 1, 5 and/or 6, in accordance with one embodiment. For the embodiment, storage medium 902 includes linearization logic 904 comprising instructions that implement the methods of FIGS. 1, 5 and/or 6. The stored instructions may be used to program an apparatus, such as computing device 700 and/or imaging system 800, to perform the methods of FIGS. 1, 5 and/or 6, as earlier described.

In alternate embodiments, as alluded to earlier, linearization logic 912 may implement merely only some aspects of the methods of FIGS. 1, 5 and 6.

In various embodiments, storage medium 902 may be a diskette, a tape, a compact disk (CD), a digital versatile disk (DVD), a solid state storage devices, or other electrical, magnetic and/or optical storage devices of the like.

Thus, it can be seen from the above descriptions, embodiments of a novel method to conform output intensities of pens of imaging systems have been described. While the novel method has been described in terms of the foregoing embodiments, those skilled in the art will recognize that the method is not limited to the embodiments described. The method may be practiced with modifications and alterations within the spirit and scope of the appended claims.

Thus, the description is to be regarded as illustrative instead of restrictive.

What is claimed is:

1. A method comprising:
   generating a first linearization data structure having a first plurality of output value to output intensity pairs for a first pen; and
   generating, based at least in part on the first linearization data structure of the first pen, a second linearization data structure having a second plurality of output value to output intensity pairs for a second pen to conform output intensities of the second pen to output intensities of the first pen.

2. The method of claim 1, wherein the generating of the second linearization data structure comprises determining for a first output intensity of the first pen having first model values of a color space model, an output value of the second pen that yields a second output intensity having second model values of the color space model where the second model values substantially proximate the first model values.

3. The method of claim 2, wherein the determining comprises selecting the output value of the second pen from among a plurality of candidate output values of the second pen, based at least in part on the proximities of corresponding model values of the color space model of the output intensities of the candidate output values to the first model values of the first output intensity of the first pen.

4. The method of claim 3, wherein the method further comprises computing for a candidate output value, a sum of absolute differences between the color space model values of the output intensity of the candidate output value and the first model values.

5. The method of claim 4, wherein the computation of the sum of absolute differences comprises computing a difference in lightness values between the color space model values of the output intensity of the candidate output value and the first model values.

6. The method of claim 4, wherein the computation of the sum of absolute difference comprises computing a difference in chrominance values between the color space model values of the output intensity of the candidate output value and the first model values.

7. The method of claim 1, wherein the first pen is a weaker pen of the first and second pens, and the method further comprises first determining which of the first and second pens is the weaker pen.

8. The method of claim 7, wherein the determining of which of the two pens is the weaker pen comprises comparing a first output ramp of the first pen with a second output ramp of the second pen.

9. The method of claim 1, wherein the method further comprises first setting a common saturation level for the two pens to be equal to or weaker than the weaker one of the two pens.

10. The method of claim 1, wherein the first and second pens are color pens, their outputs are of the same color, and the color is a selected one of a cyan, a magenta and a yellow color.

11. The method of claim 1, wherein the first and second pens are pens of different imaging systems.

12. The method of claim 1, wherein the first and second pens are pens of one imaging system.

13. The method of claim 12, wherein the one imaging system is a bi-directional imaging system, and the first and second pens are one physical pen, with the first pen being the physical pen used in a first imaging direction, and the second pen being the physical pen used in a second imaging direction.

14. The method of claim 1, wherein the method further comprises
   generating a third linearization data structure having a third plurality of output value to output intensity pairs for use to linearize output intensities of a third pen of the imaging system; and
   generating, based at least in part on the third linearization data structure of the third pen, a fourth linearization data structure having a fourth plurality of output value to output intensity pairs for use to linearize output intensities for a fourth pen of the imaging system, and to conform the output intensities of the fourth pen to the output intensities of the third pen;
   where the first and the fourth pen, and the second and third pen are corresponding different color members of a first and a second set of pens respectively.

15. The method of claim 1, wherein at least one of the first and the second linearization data structure is of a look-up table form.

16. The method of claim 1, wherein the generating of the first linearization data structure is performed by a manufacturer of an imaging system comprising the first pen.

17. The method of claim 1, wherein the generating of the second linearization data structure is performed by a user of an imaging system comprising the second pen.

18. An article of manufacture comprising:
   a storage medium; and
   a plurality of instructions stored in the storage medium, the instructions designed to enable an apparatus to
      generating a first linearization data structure having a first plurality of output value to output intensity pairs for a first pen of a first imaging system; and
      generating, based at least in part on the first linearization data structure of the first pen, a second linearization data structure having a second plurality of output value to output intensity pairs for a second pen of a second imaging system to conform output intensities of the second pen to output intensities of the first pen.

19. The article of claim 18, wherein the instructions are designed to enable the apparatus to
   select a first output value to output intensity pair of the first linearization data structure of the first pen, the first output value to output intensity pair identifying a first output value of the first pen to yield a first output intensity,
   generate a first plurality of color space model values for the first output intensity,
   determine a second output value of the second pen that yields a second output intensity having a second plurality of color space model values that substantially proximate the first plurality of color space model values, and
   form a second output value to output intensity pair for the second linearization data structure of the second pen, using the determined second output value and the corresponding second output intensity.

20. The article of claim 19, wherein the instructions are designed to enable the apparatus to generate, as part of the determining, the second color space model values, and compute for the second output value, a sum of absolute differences between its second color space model values and the first color space model values.

21. The article of claim 19, wherein the first pen is a weaker pen of the two pens, and the instructions are further designed to enable the apparatus to first determine which of the two pens is the weaker pen.

22. The article of claim 18, wherein the first and second imaging systems are the same imaging system.

23. The article of claim 18, wherein the apparatus and at least a selected one of the first and second imaging systems are one of the same.

24. A method comprising the steps of:
   creating a first linearization data structure having a first plurality of output value to output intensity pairs for a first pen; and
   creating, based at least in part on the first linearization data structure of the first pen, a second linearization data structure having a second plurality of output value to output intensity pairs for a second pen to conform output intensities of the second pen to output intensities of the first pen.

25. The method of claim 24, wherein the step of creating the second linearization data structure comprises a step of deciding for a first output intensity of the first pen having first model values of a color space model, an output value of the second pen that yields a second output intensity having second model values of the color space model where the second model values substantially proximate the first model values.

* * * * *